United States Patent
Tabata et al.

(10) Patent No.: US 7,233,815 B2
(45) Date of Patent: Jun. 19, 2007

(54) RADIO COMMUNICATION SYSTEM FOR VEHICLE

(75) Inventors: Hajime Tabata, Saitama (JP); Yukio Miyamaru, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 269 days.

(21) Appl. No.: 10/934,351

(22) Filed: Sep. 7, 2004

(65) Prior Publication Data

US 2005/0170791 A1    Aug. 4, 2005

Related U.S. Application Data

(62) Division of application No. 09/655,846, filed on Sep. 6, 2000, now Pat. No. 6,876,845.

(30) Foreign Application Priority Data

Sep. 6, 1999    (JP) ................................. 11-252349

(51) Int. Cl.
*H04M 1/00*    (2006.01)
(52) U.S. Cl. .............................. 455/575.2; 455/575.7; 455/90.3
(58) Field of Classification Search ............. 455/575.2, 455/575.1, 575.7, 90.3, 566, 550.1, 569.1
See application file for complete search history.

(56) References Cited

U.S. PATENT DOCUMENTS

| | | | |
|---|---|---|---|
| 3,908,168 A | | 9/1975 | McMahon |
| 4,524,461 A | * | 6/1985 | Kostanty et al. .............. 455/79 |
| 5,230,080 A | * | 7/1993 | Fabre et al. ................... 455/15 |
| 5,404,577 A | * | 4/1995 | Zuckerman et al. ....... 455/66.1 |
| 5,600,333 A | * | 2/1997 | Justice et al. ............... 343/713 |
| 5,678,205 A | * | 10/1997 | Gray .......................... 455/90.3 |
| 5,703,794 A | | 12/1997 | Heddle et al. |
| 5,839,055 A | | 11/1998 | Higuchi et al. |

(Continued)

FOREIGN PATENT DOCUMENTS

DE    298 17 803    2/1999

(Continued)

*Primary Examiner*—Joseph Feild
*Assistant Examiner*—Huy D Nguyen
(74) *Attorney, Agent, or Firm*—Birch, Stewart, Kolasch & Birch, LLP

(57) ABSTRACT

A radio communication system for a vehicle which allows communication not only between a driver and a passenger of one vehicle but also with a driver or a passenger of another vehicle without increasing the scale of a radio communication apparatus to be mounted on a helmet. A radio wave signaled from a radio wave transmitter-receiver of a driver or a passenger of a vehicle is received by a repeating apparatus of the self-vehicle and amplified by and re-signaled from the repeating apparatus. The radio wave signaled from the repeating apparatus is received by a radio wave transmitter-receiver of a driver or a passenger of another vehicle and reproduced by a speaker. A radio wave signaled from the radio wave transmitter-receiver of the driver or a passenger of the vehicle is received by a repeating apparatus of the self-vehicle and amplified by and re-signaled from the repeating apparatus. The radio wave signaled from the repeating apparatus is received by the radio wave transmitter-receiver of a driver or a passenger of the vehicle and reproduced by a speaker.

19 Claims, 14 Drawing Sheets

74A,74B:REPEATING APPARATUS

U.S. PATENT DOCUMENTS

| | | | |
|---|---|---|---|
| 5,901,342 A * | 5/1999 | Heiskari et al. ........... 455/11.1 |
| 6,009,563 A | 1/2000 | Swanson et al. |
| 6,017,049 A | 1/2000 | Spector |
| 6,069,588 A | 5/2000 | O'Neill, Jr. |
| 6,111,964 A | 8/2000 | Ishibashi |
| 6,359,871 B1 * | 3/2002 | Chung et al. ............... 370/338 |

| | | | |
|---|---|---|---|
| 2002/0030483 A1 * | 3/2002 | Gilboa .................. 324/207.17 |

FOREIGN PATENT DOCUMENTS

| | | |
|---|---|---|
| EP | 0 412 205 | 2/1991 |
| JP | 62-155535 | 10/1987 |

* cited by examiner

74: REPEATING APPARATUS 74A, 74B: REPEATING APPARATUS

TO HELMET

FIG. 6

| Operation switch | | Controller | MIX & MUTE output (to TC) | | | | |
|---|---|---|---|---|---|---|---|
| | | | TEL | Radio | Music | Sound | Mix |
| Sound volume ↑↓ | | Sound volume increasing/decreasing signal | ○ | ○ | ○ | ○ | ○ |
| MUTE | | MUTE signal | ○ | ○ | MUTE | MUTE | MUTE |
| TEL/radio | | ·TEL/radio changeover ·Control of the selection side | ○/MUTE | MUTE/○ | MUTE | MUTE | |
| PTT | On | — | ○ | ○ | ○ | ○ | ○ |
| | off | | | | | | |

FIG. 18
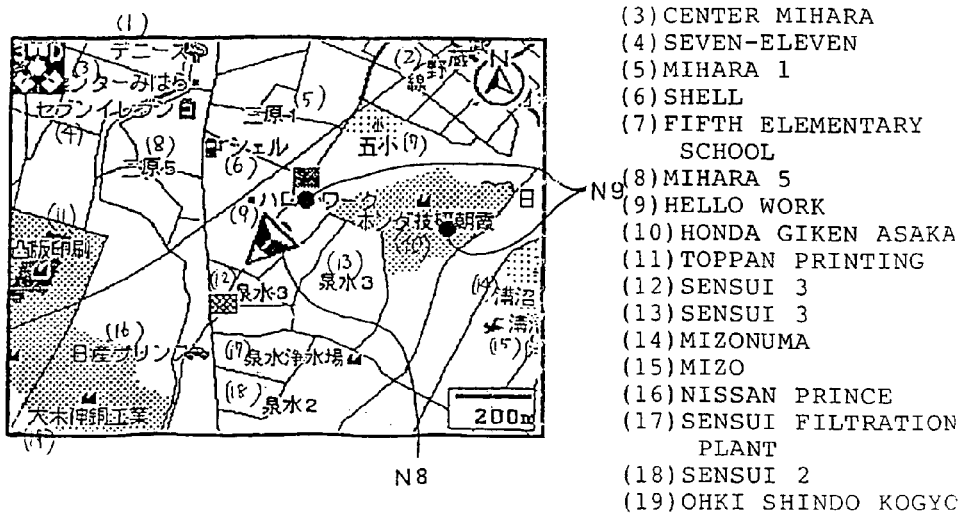
(1) DENNY'S
(2) MUSASHINO LINE
(3) CENTER MIHARA
(4) SEVEN-ELEVEN
(5) MIHARA 1
(6) SHELL
(7) FIFTH ELEMENTARY SCHOOL
(8) MIHARA 5
(9) HELLO WORK
(10) HONDA GIKEN ASAKA
(11) TOPPAN PRINTING
(12) SENSUI 3
(13) SENSUI 3
(14) MIZONUMA
(15) MIZO
(16) NISSAN PRINCE
(17) SENSUI FILTRATION PLANT
(18) SENSUI 2
(19) OHKI SHINDO KOGYO
FIG. 19   SATELLITE ARRANGEMENT
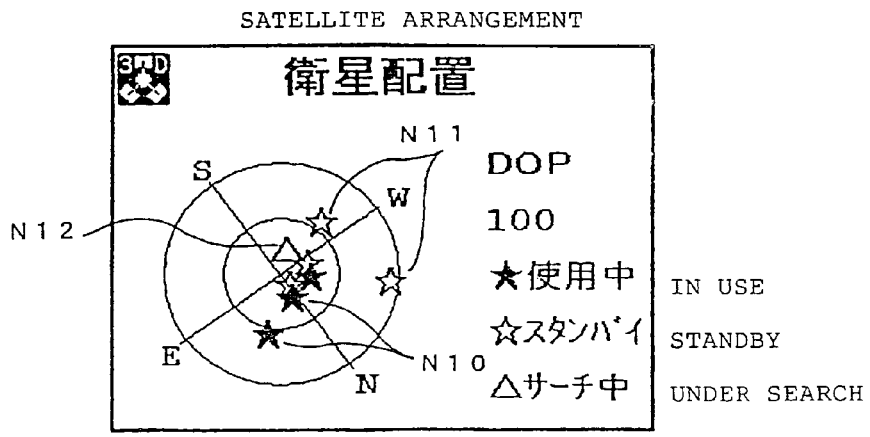
IN USE
STANDBY
UNDER SEARCH
FIG. 20
DOP VALUE
VELOCITY
LATITUDE: 35°48'16.5"
  NORTH
LONGITUDE: 139°34'53.1"
  EAST

RADIO COMMUNICATION SYSTEM FOR VEHICLE

CROSS-REFERENCE TO RELATED APPLICATION

The present application is a Divisional of U.S. application Ser. No. 09/655,846 filed on Sep. 6, 2000 now U.S. Pat. No. 6,876,845, and claims priority under 35 U.S.C. §119 to Japanese Patent Application No. Hei-11-252349, filed Sep. 6, 1999, the entire contents of which are hereby incorporated by reference.

BACKGROUND OF THE INVENTION

1. Field of the Invention

This invention relates to a radio communication system for a vehicle, and more particularly to a radio communication system for a vehicle wherein a radio communication apparatus is provided on a helmet and performs radio communication with another radio communication apparatus provided on another helmet through a repeating apparatus carried on a vehicle.

2. Description of Background Art

A radio communication system to allow conversation between passengers on a two-wheeled vehicle includes a speaker, a microphone and a transmitter-receiver provided on a helmet for each of the passengers and the radio communication apparatus communicates directly with each other. Such a radio communication apparatus is disclosed, for example, in Japanese Utility-Model Laid-open No. Sho 62-155535.

In order to make it possible to perform communication by a radio communication apparatus provided on helmets not only between a driver and a fellow passenger as described above but also with a passenger of another vehicle, a high output power signal is required. Accordingly, it is necessary to increase the scale of a drive circuit and a battery and add a power saving circuit for reducing the power consumption or the like. In addition, a problem occurs in that the apparatus becomes large in scale.

SUMMARY AND OBJECTS OF THE INVENTION

It is an object of the present invention to solve the problem of the prior art described above and provide a radio communication system for a vehicle which allows communication not only between fellow passengers but also with a passenger in another vehicle with low power consumption without increasing the scale of a transmitter-receiver to be mounted on a helmet.

In order to attain the object described above, the present invention includes a radio communication apparatus mounted on each of helmets to be worn by a driver and a passenger of the vehicle and includes at least a speaker, a microphone and a radio wave transmitter-receiver. A repeating apparatus is mounted on the vehicle side for communicating with the radio wave transmitter-receiver. The radio communication apparatus mounted on the helmets communicate with each other through the repeating apparatus.

With the characteristic described above, since the radio communication apparatus mounted on each helmet always transmits to the repeating apparatus irrespective of the position of the radio communication apparatus of the other party, it is required only to provide the transmitter-receiver of the radio communication apparatus with a minimum transmission capacity required for communication over a very short distance with the repeating apparatus. Thus, a reduction in the size and the weight of the transmitter-receiver and a reduction in the power consumption occurs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a view illustrating operation of a mix/mute section in the form of a table;

FIG. 18 is a view showing a display example (4) of the PDA displaying panel;

FIG. 19 is a view showing a display example (5) of the PDA displaying panel;

FIG. 20 is a view showing a display example (6) of the PDA displaying panel;

DETAILED DESCRIPTION OF THE PREFERRED EMBODIMENTS

Figure 1:
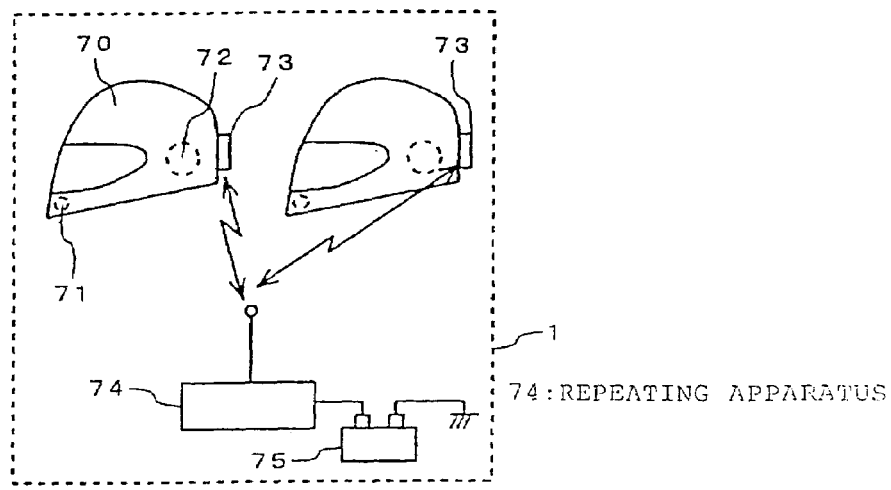
FIG. 1 is a view schematically illustrating a communication method between fellow passengers by a radio communication system for a vehicle to which the present invention is applied.
Figure 2:
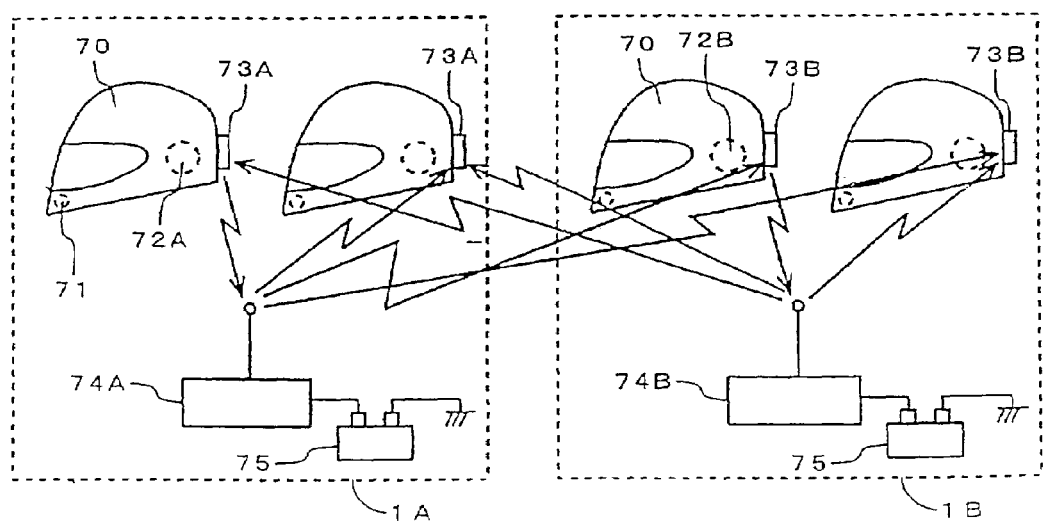
FIG. 2 is a view schematically illustrating a communication method between additional individuals other than the fellow passengers by a radio communication system for a vehicle to which the present invention is applied.

In the following, the present invention is described in detail with reference to the drawings. FIGS. 1 and 2 are views schematically illustrating communication methods by a radio communication system for a vehicle to which the present invention is applied, and here, it is described taking communication between four passengers on two vehicles as an example.

On a helmet 70 worn by each passenger, a radio communication apparatus 1 including a microphone 71, a speaker 72 and a radio wave transmitter-receiver 73 is provided. The radio wave transmitter-receiver 73 has a whip antenna with a contracted coil, which is hereinafter described, built therein, and the antenna is not exposed outside the radio wave transmitter-receiver 73. The radio wave transmitter-receiver 73 is removably mounted at the center of a rear portion of the helmet 70 through a removable fixing member.

A repeating apparatus 74 for radio communication with the radio wave transmitter-receivers 73 is provided on each vehicle. The repeating apparatus 74 includes a down-converter not shown that converts an output voltage (for example, 12 V) of a vehicle-carried battery 75 into a predetermined driving voltage (for example, 5 V) and uses the predetermined driving voltage as a driving source.

In such a construction as described above, in order for passengers of the same vehicle, that is, a driver and a fellow passenger, to communicate with each other, as illustrated in FIG. 1, for example, the voice of the driver is detected and converted into a sound signal by the microphone 71 and transferred to the radio wave transmitter-receiver 73. The radio wave transmitter-receiver 73 of the driver communicates with the radio wave transmitter-receiver 73 of the fellow passenger through the repeating apparatus 74 of the same vehicle.

On the other hand, in order for passengers operating different vehicles to communicate with each other, as illustrated in FIG. 2, a radio wave signaled from the radio wave transmitter-receiver 73A of the driver of the vehicle 1A is received by the repeating apparatus 74A of the same vehicle and amplified by and re-signaled from the repeating apparatus 74A. The radio wave signaled from the repeating apparatus A is received by the radio wave transmitter-receiver 73A of the fellow passenger while it is received simultaneously by the radio wave transmitter-receivers 73B of the driver and the fellow passenger of the vehicle 1B and reproduced by the speaker 72B.

On the other hand, a radio wave signaled form the radio wave transmitter-receiver 73B of the driver of the vehicle 1B is received by the repeating apparatus 74B of the same vehicle and amplified by and re-signaled from the repeating apparatus 74B. The radio wave signaled from the repeating apparatus 74B is received by the radio wave transmitter-receiver 73B of the fellow passenger while it is received simultaneously by the radio wave transmitter-receivers 73A of the driver and the fellow passenger of the vehicle 1A and reproduced by the speaker 72A.

Figure 3:
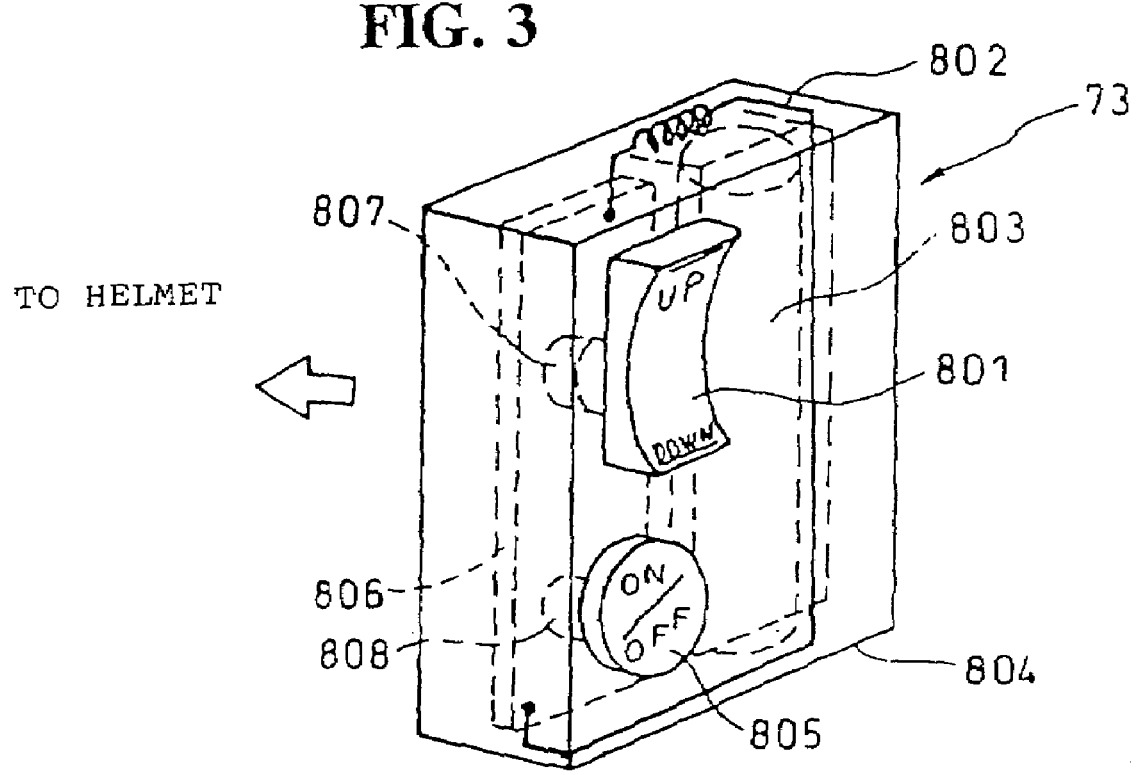
FIG. 3 is a perspective view illustrated partially in a broken away view an embodiment of a transmitter-receiver.
Figure 4:
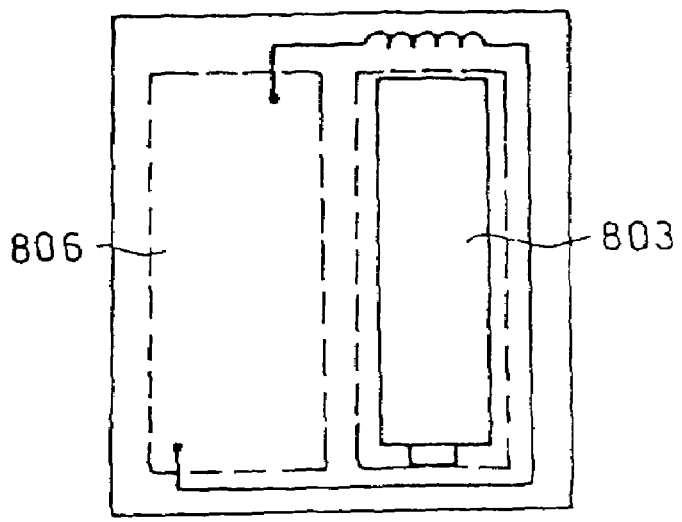
FIG. 4 is a front elevational view showing partially in a broken away view an internal construction of the transmitter-receiver.

FIG. 3 is a perspective view partially in a broken away view of the radio wave transmitter-receiver 73, and FIG. 4 is a front elevational view taken partially in a broken away view showing an internal structure of the radio wave transmitter-receiver 73.

The radio wave transmitter-receiver 73 includes a circuit board 806, a cell 803 of the size of a AAA battery and a whip antenna 802 with a contracted coil built in a parallelepiped resin case 804, and the circuit board 806 and the cell 803 that is the size of a AAA battery have comparatively a large mass and are disposed such that they are distributed to the left and the right in the resin case 804 to provide a weight balance when the radio wave transmitter-receiver 73 is mounted at the center of a rear portion of the helmet 70. The whip antenna 802 with a contracted coil is accommodated such that it crawls along an inner side in the resin case 804.

A seesaw switch 807 for providing a sound volume adjustment and a power supply switch 808 are mounted together with various circuit elements on the circuit board 806. Operation buttons 801 and 805 for the switches 807 and 808 are exposed to the left side of a face which is positioned on a rear face where the radio wave transmitter-receiver 73 is mounted at the center of the rear portion of the helmet 70.

Since, in the present embodiment, the circuit board 806 and the cell 803 of the size of a AAA battery which have comparatively great masses are disposed such that they are distributed to the left and the right in the resin case 804, even if the transmitter-receiver 73 is mounted at the center of the rear portion of the helmet 70, the weight balance of the entire helmet is maintained. In such a situation the mounting feeling of the helmet is not deteriorated nor does the handling of the helmet become difficult.

Further, when the radio wave transmitter-receiver 73 is mounted on the rear central portion of the helmet 70, since the operation buttons 801 and 805 for the switches are provided on the back face, opposite to the helmet, of the radio wave transmitter-receiver 73, they can be readily operated and accurately operated with either the left or the right hand. Furthermore, since the operation buttons 801 and 805 are provided on the left side on the rear face, an operation of the buttons particularly with the left hand is easy, and also during driving, it can be operated without taking the hand from the throttle grip.

Figure 5:
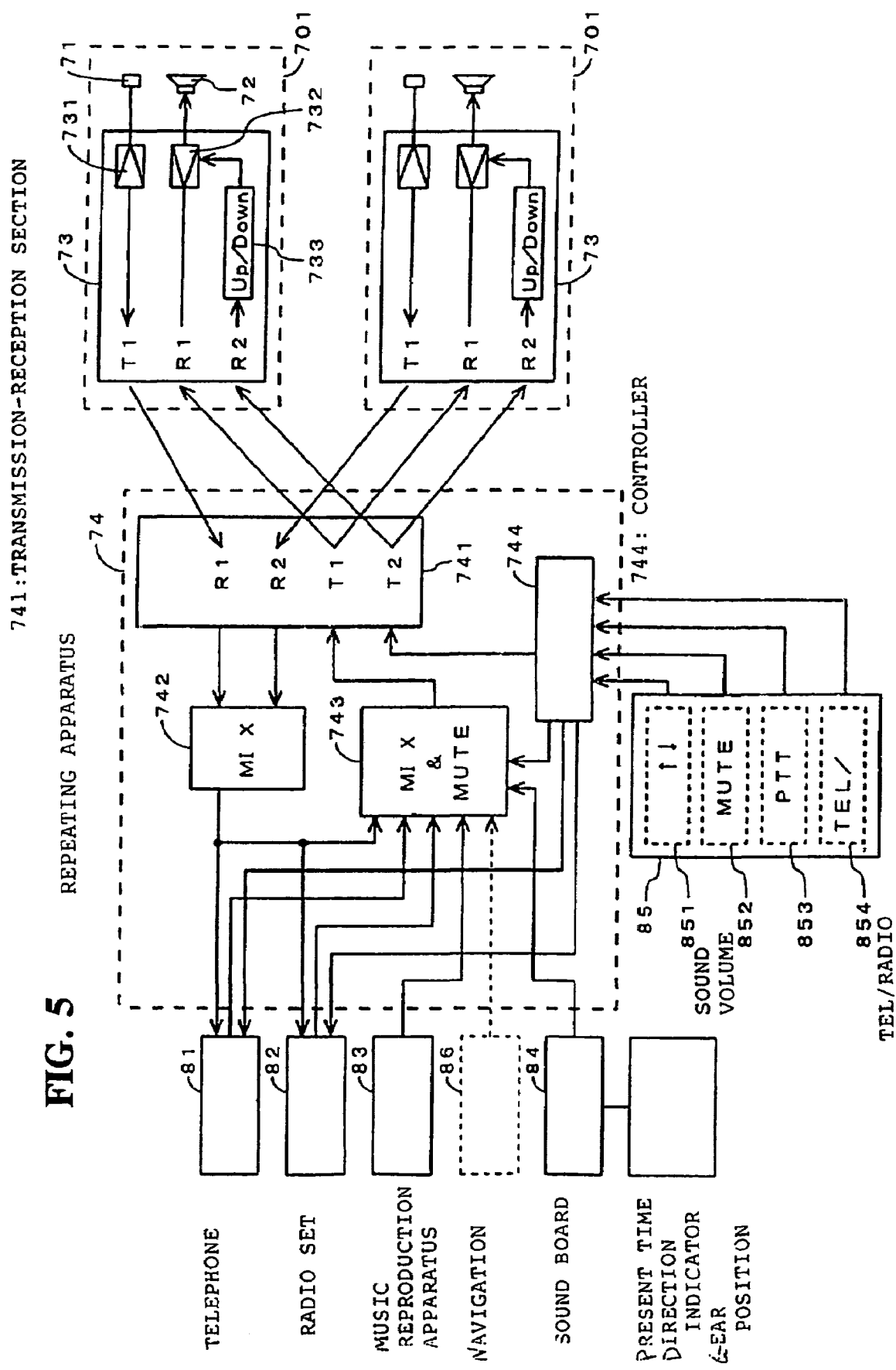
FIG. 5 is a block diagram of the radio communication system for a vehicle of the embodiment of the present invention.

FIG. 5 is a block diagram of an embodiment of the radio communication system for a vehicle described above, and like reference numerals to those described above represent like elements.

The radio wave transmitter-receiver 73 of the radio communication apparatus 701 is mounted on each helmet and includes an amplifier 731 for amplifying a sound signal detected by the microphone 71, and transmits the amplified sound signal from a transmission channel T1. The radio wave transmitter-receiver 73 further includes an amplifier 732 for amplifying a sound signal received by a reception channel R1 and outputs the amplified sound signal from the speaker 72. The amplification factor of the amplifier 732 is controlled by a sound volume control section 733.

In the repeating apparatus 74, a transmission-reception section 741 has a first reception channel R1, a second reception channel R2, a first transmission channel T1 and a second transmission channel T2. The first and second reception channels R1 and R2 receive sound signals transmitted from the different radio wave transmitter-receivers 73. The first transmission channel T1 transmits sound signals to the different radio wave transmitter-receivers 73. The second transmission channel T2 transmits control signals to the different radio wave transmitter-receivers 73.

A mixing section 742 combines and outputs sound signals received by the first and second reception channels R1 and R2 of the transmission-reception section 741. A mix/mute section 743 mixes sound signals outputted from the mixing section 742, a portable telephone set 81, another radio set 82, a music reproduction apparatus 83 such as a radio set, an MD or CD apparatus, a sound board 84 and so forth and provides a resulting signal to the first transmission channel T1 of the transmission-reception section 741. It is to be noted that, where the vehicle carries a navigation system 86 as in the present embodiment, also a sound signal signaled from the navigation system 86 is mixed. The sound board 84 converts the present time, a gear position, a state of a direction indicator or the like into a sound signal and outputs the sound signal.

The mix/mute section 743 has a mute function and attenuates or interrupts (mutes), when a sound source (for example, the portable telephone set 81) having a higher priority order and another sound source (for example, the music reproduction apparatus 83) having a lower priority order interferes with each other. The signal signaled from the sound source having a lower priority order is hereinafter described in detail.

A controller 744 produces a control signal in response to an operation of a switch provided on an operation panel 85 which is hereinafter described, and provides the control signal to the mix/mute section 743 or the second transmission channel T2 of the transmission-reception section 741. On the operation panel 85, a sound volume adjustment switch 851, a mute switch 852, a PTT switch 853 and a telephone/radio changeover switch 854 are provided.

FIG. 6 is a view showing the action of the mix/mute section 743 in the form of a table. If the sound volume adjustment switch 851 is operated, then the controller 744 produces a sound volume increasing/decreasing signal in response to the operation of the sound volume adjustment switch 851 and signals the sound volume increasing/decreasing signal to the transmission-reception section 741. The transmission-reception section 741 transmits the sound volume increasing/decreasing signal from the second transmission channel T2. The sound volume increasing/decreasing signal is received by the second reception channels R2 of the radio wave transmitter-receivers 73 of the radio communication apparatus 701 and inputted to the individual sound volume control sections 733. Each sound volume control section 733 controls the amplification factor of the amplifier 732 in response to the received sound volume increasing/decreasing signal.

If the mute switch 852 is operated, then the controller 744 produces a mute signal in response to the operation of the mute switch 852 and signals the mute signal to the mix/mute section 743. The mix/mute section 743 attenuates (or interrupts) output signals of the music reproduction apparatus 83, sound board 84 and mixing section 742 while it outputs output signals of the telephone set 81 and the radio set 82 as they are.

If the PTT switch 853 is switched on while the telephone/radio changeover switch 854 is switched to the telephone side, then the output signals of the radio set 82, music reproduction apparatus 83 and sound board 84 are attenuated by the mix/mute section 743. If the PTT switch is depressed while the telephone/radio changeover switch is switched to the radio side, then the output signals of the portable telephone set 81, music reproduction apparatus 83 and sound board 84 are attenuated similarly.

Figure 8:
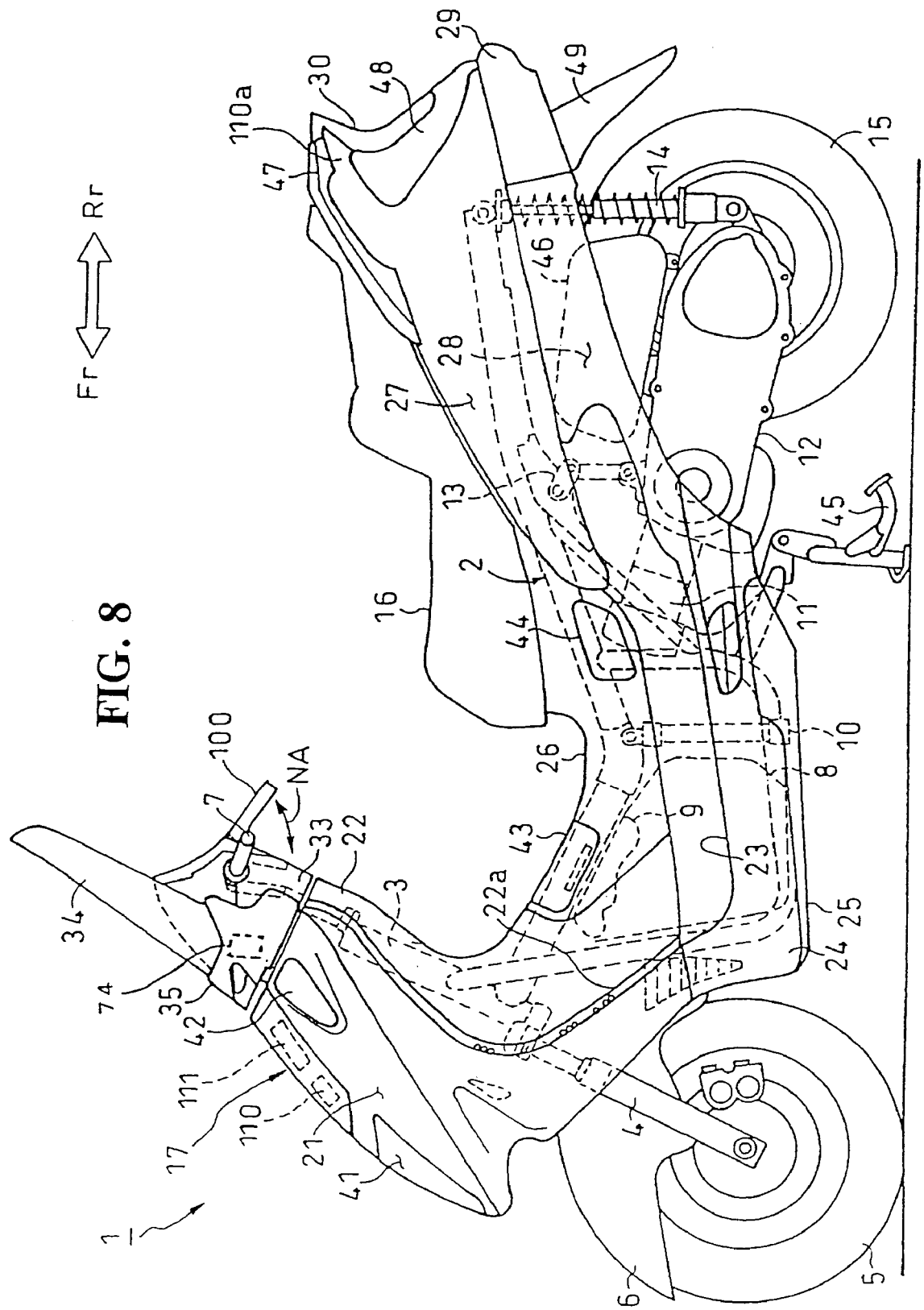
FIG. 8 is a side elevational view of a motorcycle to which the radio communication system for a vehicle of the present invention is applied.
Figure 9:
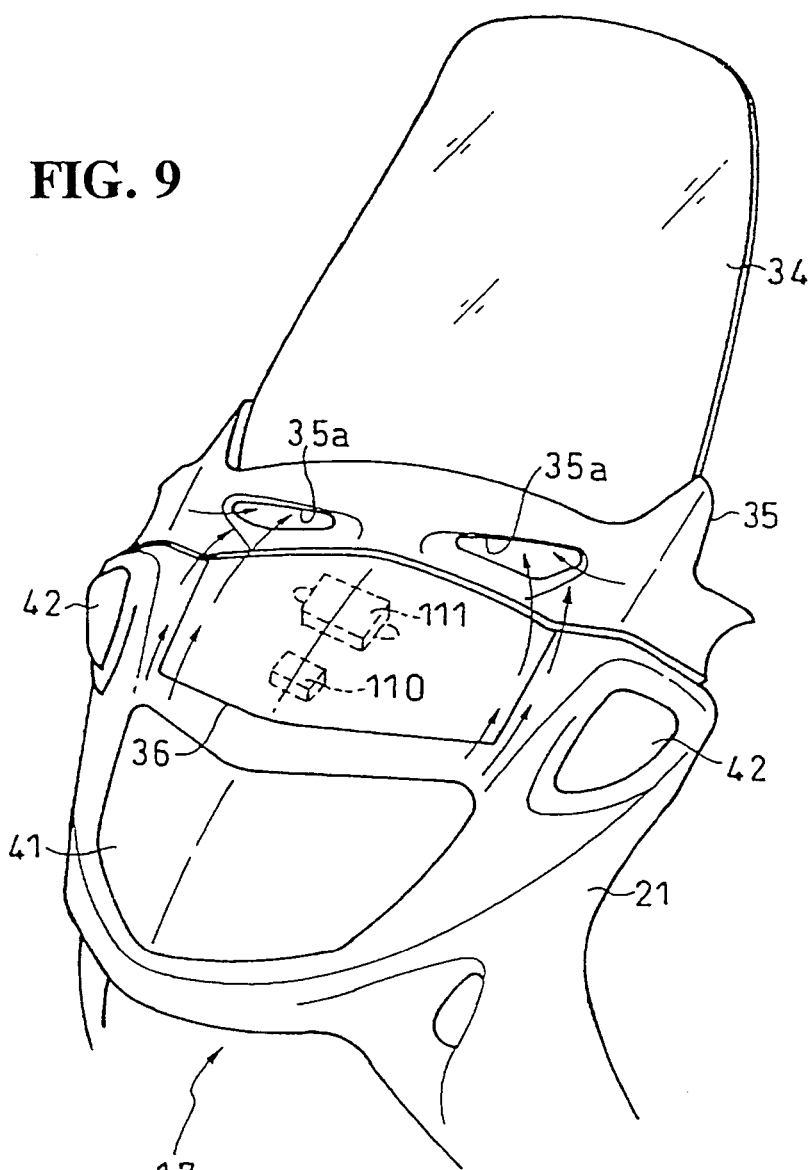
FIG. 9 is a perspective view of a front portion of the vehicle.

FIG. 8 is a side elevational view of a motorcycle on which the repeating apparatus 74 of the radio communication system for a vehicle described above is carried, and FIG. 9 is a perspective view of an essential part of the motorcycle. The motorcycle (hereinafter referred to as "vehicle") 1 of the scooter type has a body frame 2 of the double cradle type which extends in the forward and backward direction of a vehicle body. A head pipe 3 is mounted at a front end of the body frame 2, and a front wheel 5 is mounted at an end of a front fork 4 which extends downwardly from the head pipe 3. An upper portion of the front wheel 5 is covered with a front fender 6. A handlebar 7 is secured to an upper portion of the front fork 4, and front and rear portions of the handlebar 7 are covered with a handle cover 33 which is divided into two forward and backward portions.

A transparent window screen 34 is provided on the handle cover 33 by a stay not shown, and a screen garnish 35 as a cover member is provided at a lower portion of a front face of the window screen 34. The repeating apparatus 74 is disposed at the rear portion of an instrument panel inside of the screen garnish 35. A PDA accommodation box (hereinafter referred to merely as "box") 100 which can accommodate therein a PDA (details of which are hereinafter described) used for the navigation system is provided on the handle cover 33. The box 100 is supported for rocking motion in directions indicated by an arrow mark NA.

A fuel tank 8, a radiator reservoir tank 9, and a radiator 10 are provided in a cradle space surrounded by pipes of the body frame 2, and a power unit 12 having a water-cooled engine 11 provided at a front portion thereof is provided rearwardly of the cradle space. The power unit 12 is mounted for rocking motion on the body frame 2 with a front portion thereof suspended by a link mechanism 13 and with a rear end portion thereof suspended by a rear cushion 14. A rear wheel 15 is mounted at a rear portion of the power unit 12, and the body frame 2 is covered with a body cover 17 and a seat 16 is disposed at a rear upper portion of the body frame 2.

A front portion of the body cover 17 is formed from a front cover 21 which covers a front portion of the head pipe 3 and an upper portion of the front wheel 5 and an inner cover 22 which covers a rear portion of the front cover 21. A pair of left and right floor steps 23 on which the feet of a driver are placed extend rearwardly from the inner cover 22, and a pair of floor skirts 24 extend downwardly from outer edges of the floor steps 23. An under cover 25 provides a cover between the lower ends of the floor skirts 24, and a center cover 26 which extends rearwardly from the inner cover 22 which covers a longitudinally central portion of the body frame 2. The opposite side faces of a rear portion of the body frame 2 are covered with side covers 27 extending rearwardly from the center cover 26.

A pair of left and right lower side covers 28 extend downwardly from outer edges of the side covers 27, and a lower portion of the rear end of the body frame 2 is covered with a rear center cover 29 provided rearwardly of the lower side covers 28. An upper portion of the rear end of the body frame 2 is covered with a rear upper cover 30 provided above the rear center cover 29.

A headlamp 41 and direction indicator lights 42 are mounted on the front cover 21. Further, a GPS sensor 110 which receives GPS satellite radio waves for a navigation system and outputs measurement position data and an MPU 111 serving as a system controller for controlling the navigation system are disposed on the front cover 21. It is to be noted that the location of the GPS sensor 110 is not limited to the front portion of the vehicle body, but it may be mounted at such a position of a rear end portion of the vehicle body (reference character 110a) which is not hidden by a driver such as, for example, the rear upper cover 30. A pair of air inlet ports 35a, 35a are provided in the screen garnish 35, and air flowing along the front face of the front cover 21 flows upwardly and is introduced into the air inlet ports 35a.

A fuel supply lid 43 and an ignition plug-checking lid 44 are provided at part of the center cover 26. A main stand 45 is provided at a lower portion of the vehicle body, and an air cleaner 46 is provided in the inside of the lower side covers 28. Further, a rear grip 47, a tail lamp 48, and a rear fender 49 are provided at rear portions of the vehicle body.

Figure 10:
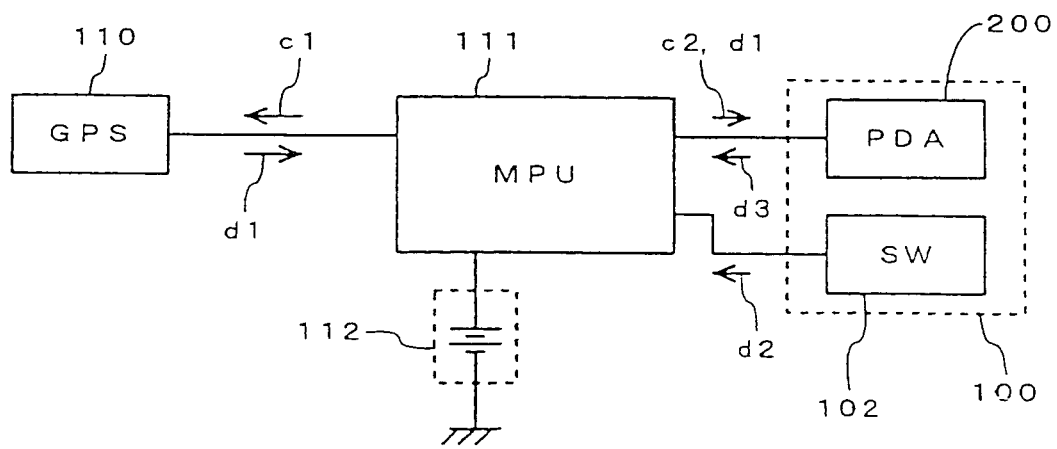
FIG. 10 is a system construction diagram of a navigation system.

FIG. 10 is a system block diagram of the navigation system. To the MPU 111 as a system controller for managing navigational operations in a concentrated manner, the GPS sensor 110 and a PDA 200 which is accommodated in the box 100 are connected. It is to be noted that a PDA is known as an information apparatus for personal use having a function of managing a schedule of a person and so forth, a display panel function for allowing inputting with a pen, a function of searching a large amount of information such as a dictionary, a manual and so forth built therein, and so forth, and the present embodiment makes it possible to use those functions as navigational functions by storage and search of map information. Also a switch 102 for causing switching or scrolling of a display screen of the PDA 200 to be performed for contracting or expanding a map is provided on the box 100, and also the switch 102 is connected to the MPU 111. Power supply to the MPU 111 is derived from a battery 112 carried on the vehicle. While the PDA 200 has a battery in the inside thereof, when it is connected to and used together with the MPU 111, it can receive a supply of power from the battery 112 through the MPU 111.

The PDA 200 has a memory into which travel data can be stored and a display screen, and provides navigation information in accordance with measurement position data from the GPS sensor 110 and a control signal from the MPU 111 to perform navigational operations. The travel data includes electronic map information and route information to a destination. The travel data is produced, for example, based on information obtained from a network such as the Internet using a personal computer and electronic map information. A travel route is produced by providing a destination as input information, and a way point such as a main intersection on the route is selected in accordance with an algorithm set in advance if the route is determined. The travel data may be inputted from a personal computer or information stored in advance in a ROM or the like may be transferred as the travel data.

The MPU 111 supplies a control signal c1 to the GPS sensor 110, and the GPS sensor 110 receives GPS satellite radio waves in accordance with the control signal c1. The GPS sensor 110 inputs measurement position data d1 based on the GPS satellite radio waves to the MPU 111. The MPU 111 analyzes the measurement position data d1 and an instruction signal d2 from the switch 102 and supplies a control signal c2 and measurement position data d1 to the PDA 200. The PDA 200 is started up by the control signal c2, executes a predetermined program using the measurement position data d1 and displays navigational information on the display panel. The PDA 200 inputs a status signal d3 indicative of an operational status to the MPU 111.

Subsequently, a mounted manner of the box 100 in which the PDA 200 described above is accommodated is described.

Figure 7:
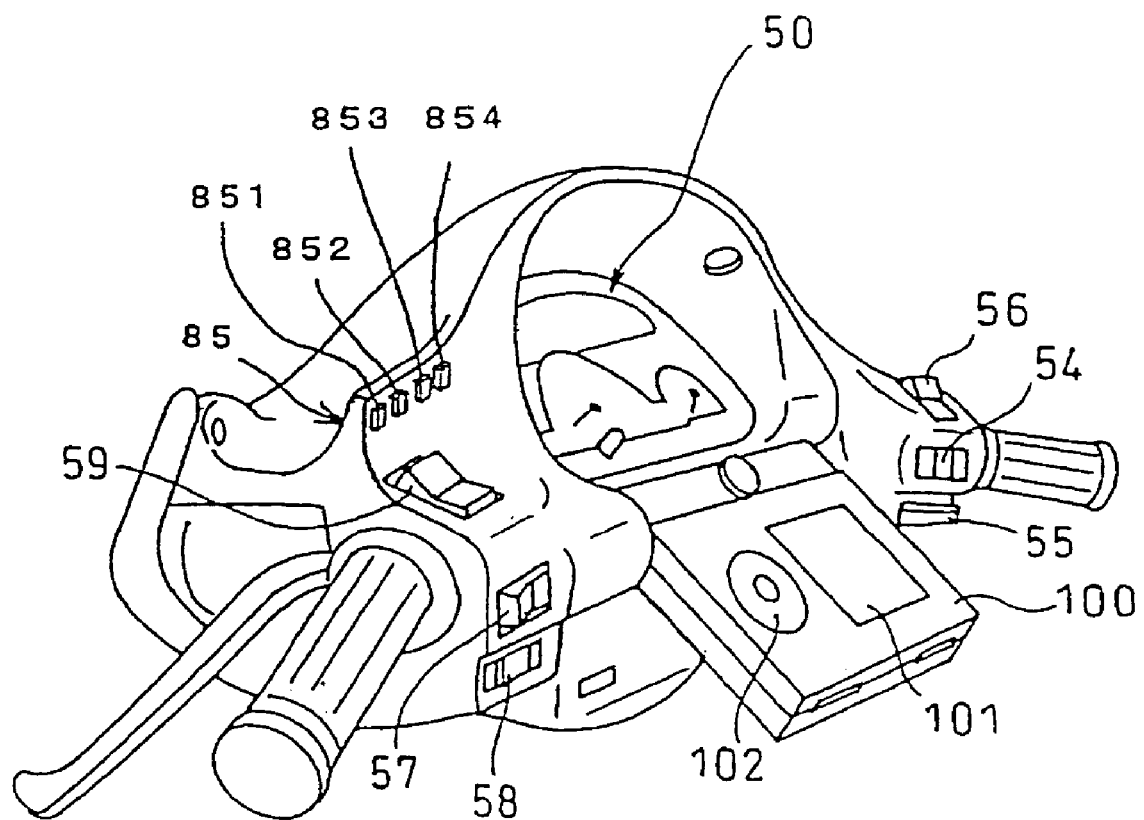
FIG. 7 is a perspective view of an instrument panel and associated members of a vehicle according to the embodiment of the present invention.
Figure 11:
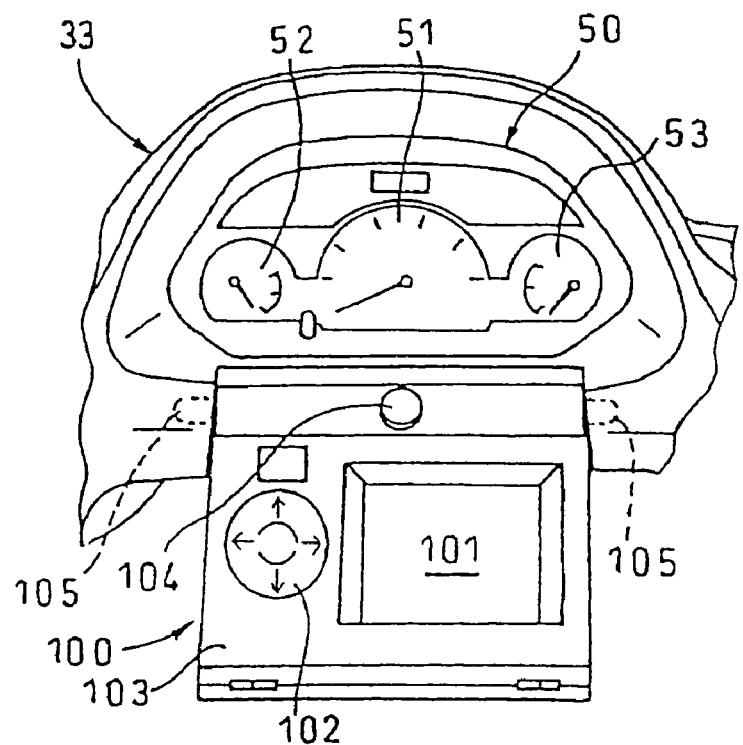
FIG. 11 is a perspective view of the front showing the instrument panel and associated members of the vehicle.
Figure 12:
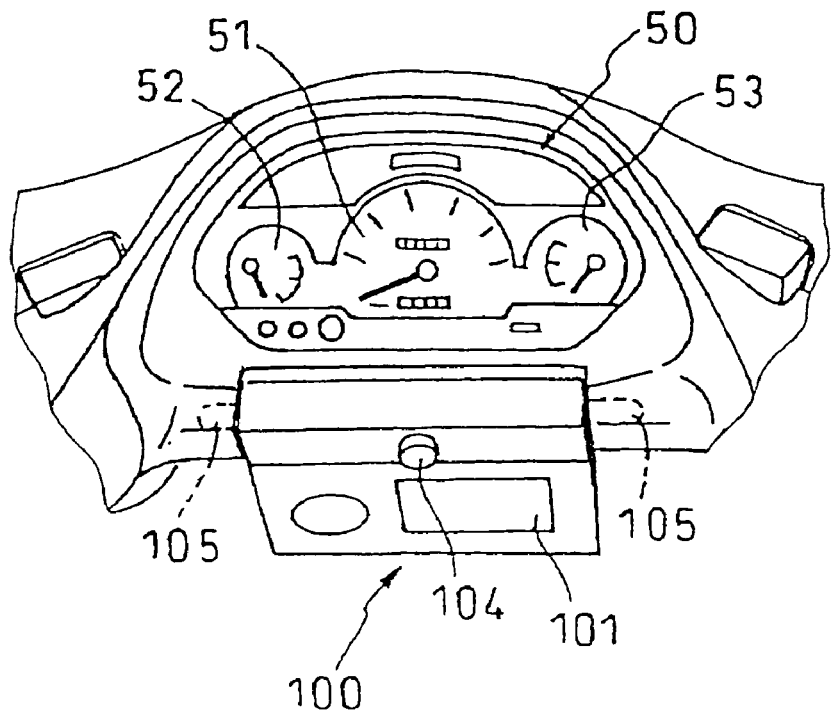
FIG. 12 is a perspective view of an essential part showing the instrument panel and associated members of the vehicle.

FIG. 7 is a sideward perspective view of a front portion of the vehicle on which the box 100 is mounted, FIG. 11 is a front perspective view of the vehicle, and FIG. 12 is a front perspective view showing a manner wherein the PDA 200 is moved (pivoted) to a position for non-use. In FIGS. 7, 11 and 12, like reference numerals to those of FIG. 8 denote like elements. It is to be noted that, in FIGS. 7, 11 and 12, a state wherein the window screen 34 is removed is illustrated. An instrument panel (meter) 50 is incorporated in the handle cover 33. A speedometer 51 is provided at the center of the face of the instrument panel 50, and a fuel gauge 52 is provided on the left side of the instrument panel 50 while a water temperature gauge 53 is provided on the right side of the instrument panel 50.

A hazard switch 54 is provided in an upper stage of the front face adjacent on the right side of the instrument panel 50 while a starter switch 55 is provided in a lower stage, and a kill switch 56 is provided on an upper face. Further, a direction indicator switch 57 is provided in an upper stage of the front face adjacent on the left side of the instrument panel 50 while a horn switch 58 is provided in a lower stage, and the operational panel 85 and a high beam/low beam switch 59 are provided on an upper face.

The box 100 is mounted along a lower edge of the instrument panel 50. The box 100 is so dimensioned and shaped that a PDA having a memory in which map information to be used for the navigation system can be stored and a display panel can be accommodated in the box 100. A window 101 in which a transparent glass plate, a transparent acrylic sheet or the like is provided so that the display panel of the PDA 200 accommodated in the box 100 may be observed therethrough and a switch 102 are provided on the box 100. For the switch 102, a switch which can be operated leftwardly, rightwardly, upwardly and downwardly as indicated by arrow marks in FIG. 11 is used, and a click to the left or the right is used for the switching of the display panel of the PDA 200 whereas a click to upwards or downwards is used for an enlargement or contraction of a map or the like. A face 103 of the box 100 on which the window 101 and the switch 102 are provided is formed as a lid, and removal or insertion of a PDA is performed with the lid 103 opened. A knob 104 is provided on the lid 103 such that the lid 103 can be latched and unlatched by turning the knob 104. Preferably, the knob 104 can be operated to latch and unlatch by means of an engine key for the sake of security.

The box 100 has a pair of pivot shafts 105 projecting leftwardly and rightwardly, and each of the pivot shafts 105 is supported by a bearing (not shown) incorporated in the handle cover 33. When the navigation system is to be used, the box 100 is lifted up (popped up) by spring means not shown to a position (first position) in which the display face of the PDA is substantially in register with the face of the instrument panel 50 as shown in FIGS. 7, 8 and 11. On the other hand, when the navigation system is not used, the box 100 can be pushed down so as to be retracted to a position (second position) in which the display face of the PDA, that is, the window 101, lies substantially in a vertical plane. Preferably, arresting means such as a magnetic catch is provided on the rear face of the box 100 and the handle cover 33 so that the box 100 may be fixed to the handle cover 33 in the retracted position.

Preferably, each of the pivot shafts 105 has a rotational damper provided therefor which acts against the spring means described above when the box 100 is pivoted from the retracted position (position of FIG. 12) to the use position (position of FIG. 7). This is because it is convenient for smooth pivotal motion of the box 100 and for protection of the PDA from vibrations of the vehicle and prevention of vibrations of the display screen. An oil damper wherein oil is enclosed in a package can be used for the rotational dampers. This damping action functions only when the box is pivoted to the first position, but the damper action does not function upon pivotal motion from the first position to the second position. Accordingly, when the GPS display screen, that is, the display panel of the PDA, is to be observed, the screen can be pivoted moderately from the retracted position (second position), but when the screen is to be retracted, it can be retracted rapidly.

Figure 13:
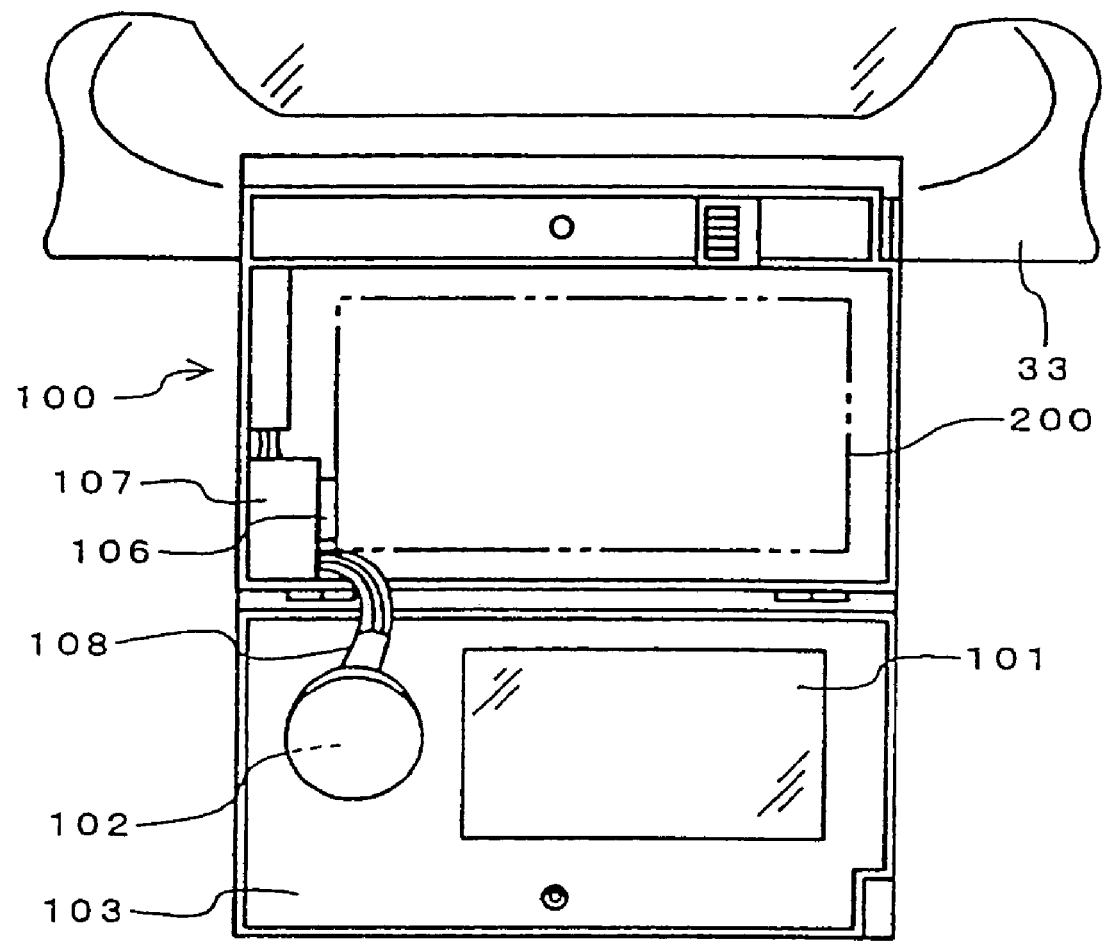
FIG. 13 is a perspective view of a PDA accommodation box illustrating a state in which a cover is open.

FIG. 13 is a perspective view of the box 100 illustrating a state wherein the lid 103 is open. A repeating section 107 having a connector 106 of multiple poles for coupling to input/output terminals of the PDA 200 is provided in the box 100. The repeating section 107 repeats a signal from the connector 106 to the MPU 111, and repeats a signal of the switch 102 to the MPU 111 over a cable 108. The PDA 200 can be removably mounted into the box 100 through the connector 106.

Accordingly, when a person gets on the vehicle, the PDA 200 can be connected to the connector 106 and incorporated as a navigation system. Further, when the driver intends to leave the vehicle, he/she can disconnect the PDA 200 from the connector 106 and draw out the PDA 100 from the box 100 and then carry it independently of the navigation system. Since the PDA 200 is accommodated in the box 100 in this manner, the PDA 200 can be removed readily from the vehicle. Consequently, this is convenient from the point of view of the prevention of burglary and this is also convenient where the PDA 200 is used as a multi-function information apparatus such that it is used as an address book or a dictionary without using it for navigation. Further, since also a connection section to a PDA is accommodated in the box 100, also the influences of rain, wind, dust and so forth can be suppressed to be low.

Figure 14:
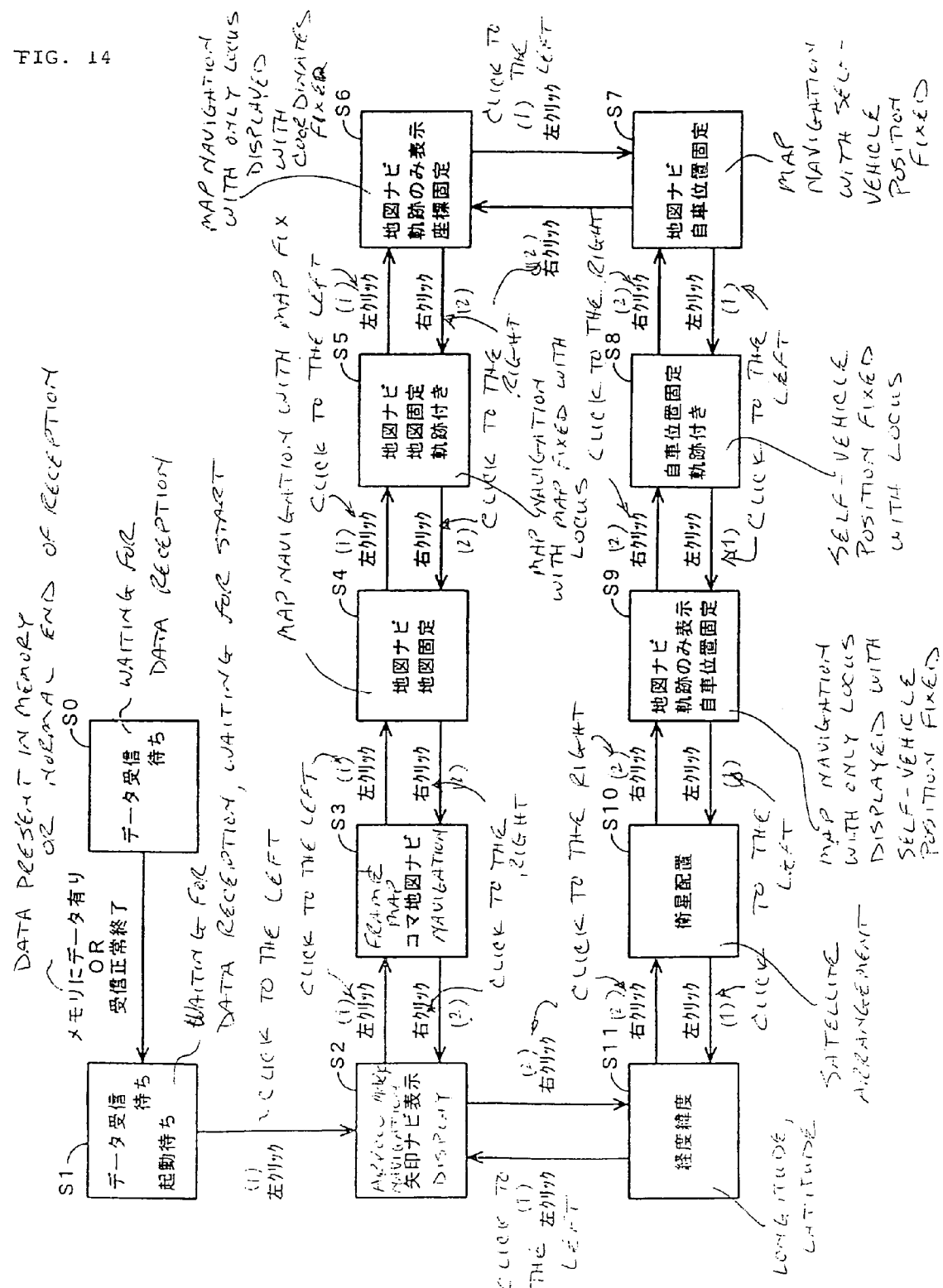
FIG. 14 is a state transition diagram in the navigation system.
Figure 15:
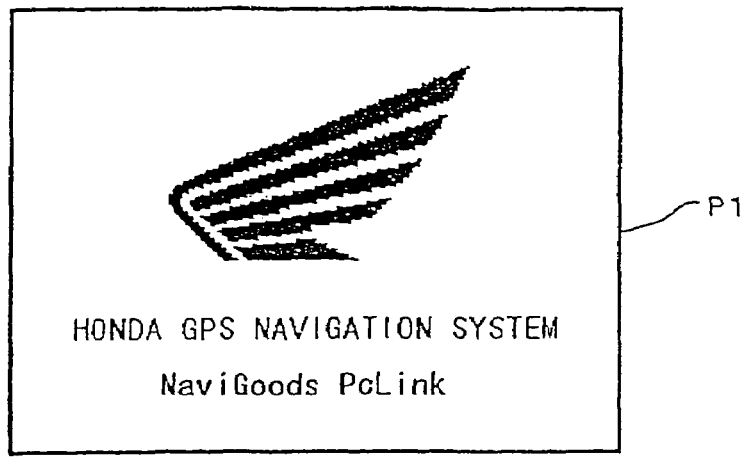
FIG. 15 is a view showing a display example (1) of the PDA displaying panel.
Figure 16:
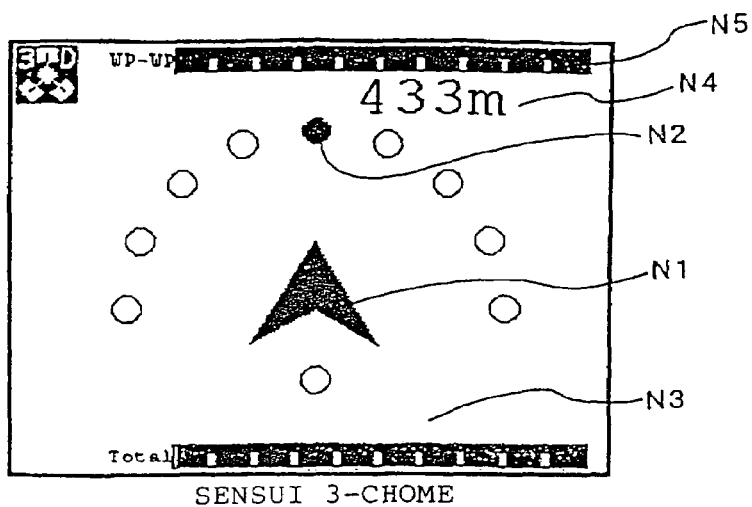
FIG. 16 is a view showing a display example (2) of the PDA displaying panel.
Figure 17:
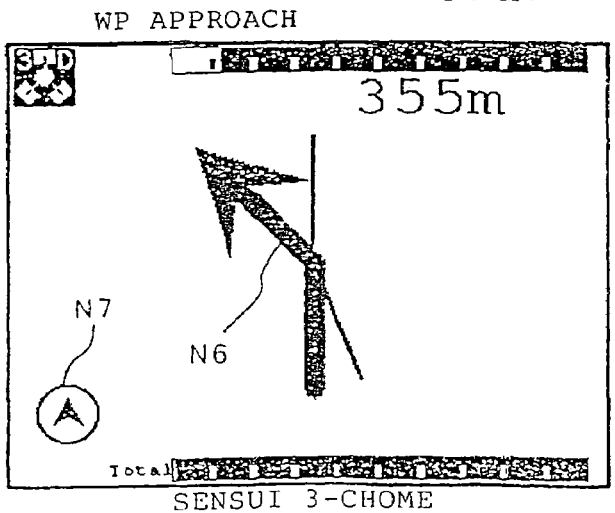
FIG. 17 is a view showing a display example (3) of the PDA displaying panel.

A status transition of the navigation system is described with reference to a status transition diagram of FIG. 14 and examples of the display screen (FIGS. 15 to 20). Referring to FIG. 14, in status S0, the navigation system is waiting for reception of data. When data is in the memory of the PDA 200 or when reception of data comes to an end regularly, the status advances to status S1. In status S1, the navigation system further waits for reception of data and waits a starting instruction. In statuses S0 and S1, a title screen P1 of FIG. 15 is displayed on the display panel.

If the switch 102 is clicked to the left in status S1, then the status advances to status S2. In status S2, an arrow mark navigation display screen is displayed (refer to FIG. 16). On the arrow mark navigation display screen, an arrow mark N1 indicative of a direction to a way point and a dot mark N2, a name N3 of the way point, a numeral N4 indicative of a great circle distance to the way point and a graphic image N5 which indicates a decrease of the distance N4 to the way point in the form of a bar graph are displayed.

If the switch 102 is clicked to the left in status S2, then the status advances to status S3. In status S3, a frame map navigation screen is displayed (refer to FIG. 17). On the frame map navigation screen, an arrow mark N6 of a shape of a way point and an advancing direction is displayed in a large size, and the direction to the way point is indicated by a small arrow mark N7. If the switch 102 is clicked to the left in status S3, then the status advances to status S4, but if the switch 102 is clicked to the right, then the status returns to status S2. In status S4, a map navigation screen is displayed. In this status S4, the map is fixed.

If the switch 102 is clicked to the left in status S4, then the status advances to status S5, but if the switch 102 is clicked to the right, then the status returns to status S3. In status S5, a map navigation screen with a travel locus is displayed in addition to the display in status S4 (refer to FIG. 18). An arrow mark N8 in FIG. 18 indicates the position of the self-vehicle and the travelling direction, and the locus is indicated by a dot N9.

If the switch 102 is clicked to the left in status S5, then the status advances to status S6, but if the switch 102 is clicked to the right, then the status returns to status S4. In status S6, a map navigation screen on which only the travelling locus is shown except a map is displayed.

If the switch 102 is clicked to the left in status S6, then the status advances to status S7, but if the switch 102 is clicked to the right, then the status returns to status S5. In status S7, a map navigation screen is displayed in a state wherein the position of the self-vehicle is fixed. Accordingly, a screen on which the map is scrolled as the self-vehicle travels is displayed.

If the switch 102 is clicked to the left in status S7, then the status advances to status S8, but if the switch 102 is clicked to the right, then the status returns to status S6. In status S8, a map navigation screen with a travel locus shown in a state wherein the position of the self-vehicle is fixed is displayed.

If the switch 102 is clicked to the left in status S8, then the status advances to status S9, but if the switch 102 is clicked to the right, then the status returns to status S7. In status S9, a map navigation screen only with a travel locus shown except a map in a state wherein the position of the self-vehicle is fixed is displayed.

If the switch 102 is clicked to the left in status S9, then the status advances to status S10, but if the switch 102 is clicked to the right, then the status returns to status S8. In status S10, the arrangement of satellites is displayed (refer to FIG. 19). In FIG. 19, satellites N10 being used, satellites N11 in a standby state and satellites N12 under search are displayed together with the direction.

If the switch 102 is clicked to the left in status S10, then the status advances to status S11, but if the switch 102 is clicked to the right, then the status returns to status S9. In status S11, latitude and longitude indicative of the position of the self-vehicle are displayed (refer to FIG. 20). On this display screen, a travelling speed,latitude, longitude and advancing direction are indicated on the display screen.

If the switch 102 is clicked to the left in status S11, then the status returns to status S2, and if the switch 102 is clicked to the right in status S2, then the status skips statuses S3 to S10 and advances to status S11.

While the status transition diagram described above illustrates an example of transition which proceeds in response to an operation of the switch 102, it is possible to perform switching between the arrow mark navigation display and the frame map navigation display in response to the position of the self-vehicle to a way point. For example, the arrow mark navigation display is displayed up to a point 400 m short of a way point, and then when the point 400 m short of the way point is reached, the display is switched from the arrow mark navigation display to frame map navigation display. Further, when the self-vehicle is spaced by 50 m from the way point after it passes the way point, or when the self-vehicle does not advance straightforwardly across an intersection and is directed to an intersection leaving direction, the way point of the object is switched and switching from the frame map navigation display to the arrow mark navigation display is performed. Further, the way point is automatically updated when the self-vehicle goes out of the preset travel route.

Figure 21:
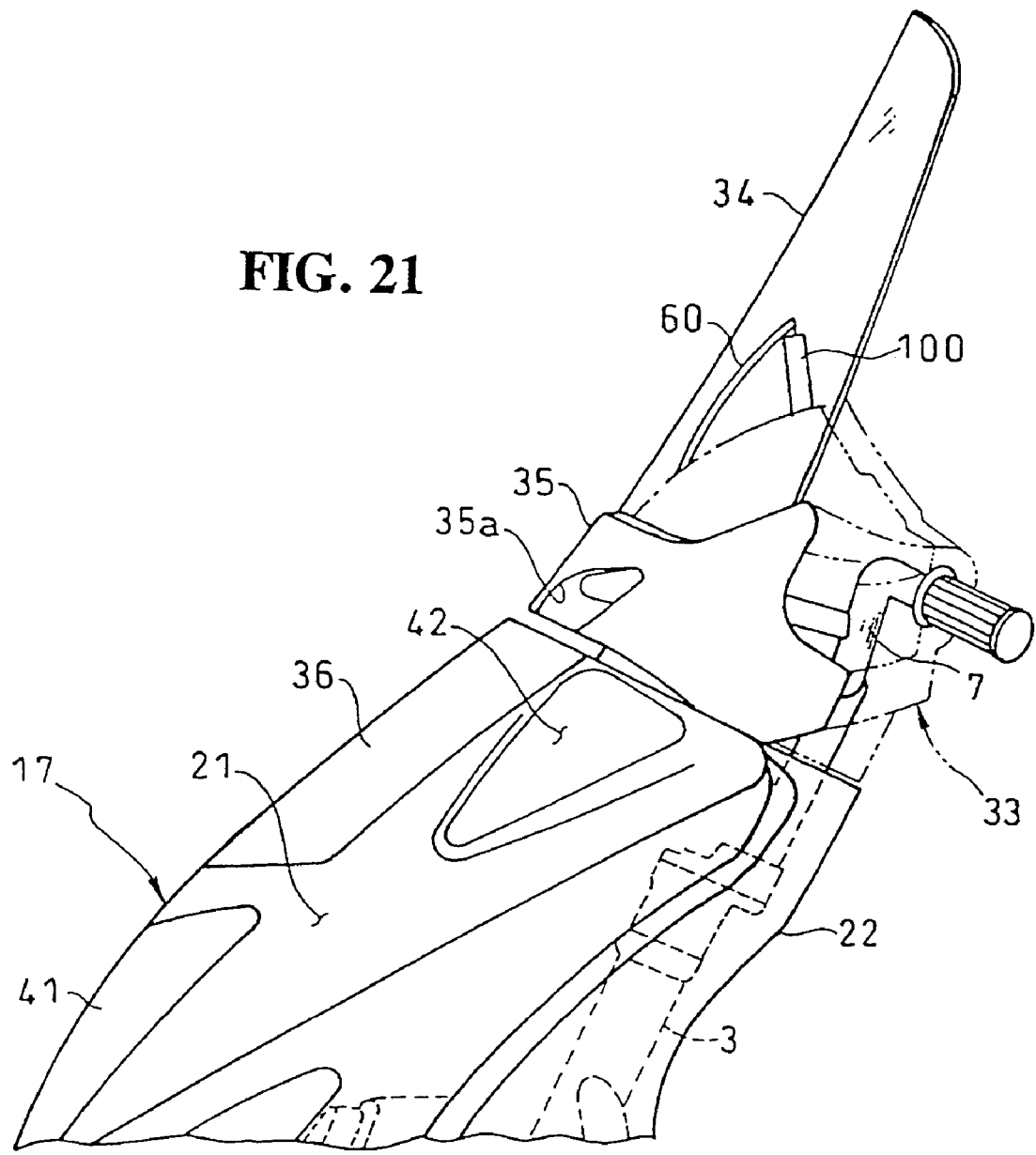
FIG. 21 is a side elevational view of a front portion showing the box provided above the instrument panel.
Figure 22:
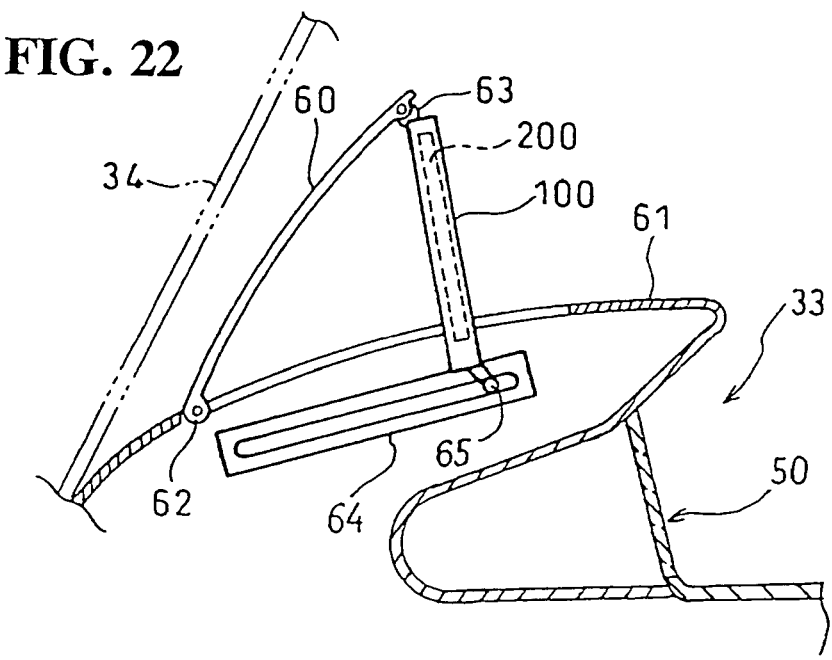
FIG. 22 is an enlarged sectional view of essential part of FIG. 21.

Subsequently, modifications are described. While, in the embodiment described above, the box 100 in which a PDA 200 is accommodated is mounted along the lower edge of the instrument panel 50, the position at which the box 100 is to be mounted is not limited to this position, and it can be mounted above the instrument panel 50. FIG. 21 is a side elevational view of a front portion of a vehicle showing the box 100 provided above the instrument panel 50, and FIG. 22 is an enlarged sectional view of an essential part of FIG. 21. Further, FIG. 23 is a sectional view when the box 100 is accommodated in a stored position.

An upper plate 60 forms part of a cover 61 which covers an upper portion of the instrument panel 50, and is supported for pivotal motion on the cover 61 by a hinge 62. To an end portion of the upper plate 60, that is, to an end portion of the upper plate 60 opposite to the side supported by the hinge 62, an upper edge of the box 100 for accommodating a PDA 200 therein is connected by a hinge 63. Further, opposite ends of a lower end of the box 100 are provided with a pair of sliders 65 which fit with and slidably move on a pair of two (only one is shown) rails 64 provided separately on the left and right of the vehicle body.

Figure 23:
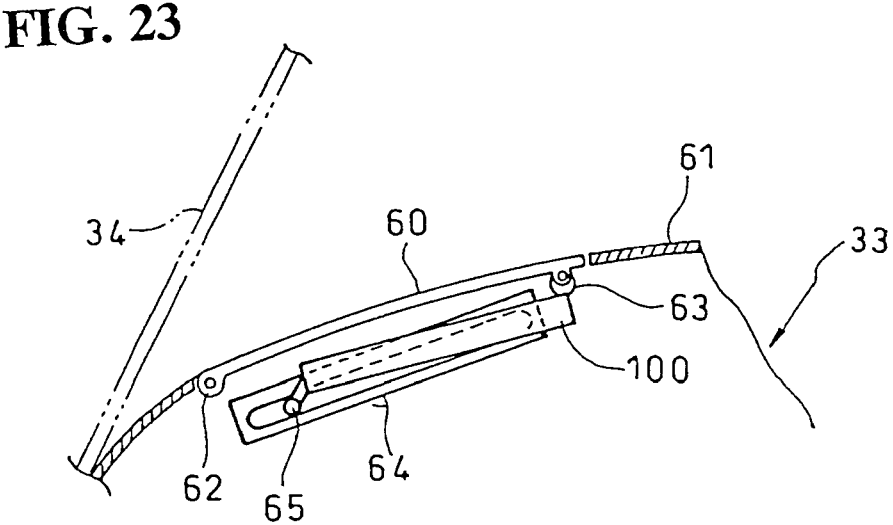
FIG. 23 is a sectional view of essential part of the vehicle when the box is accommodated.

By the construction described above, if the upper plate 60 is lifted from a state wherein the box 100 is folded as shown in FIG. 23, then since the box 100 is coupled to an end portion of the upper plate 60 by the hinge 63, it is lifted by the upper plate 60. Meanwhile, the lower edge of the box 100 slidably moves on the rails 64 by means of the sliders 65 and is guided to an end portion of the rails 64 (a rather rear portion of the vehicle body). Consequently, as shown in FIGS. 21 and 22, the box 100 is lifted with the display panel face of the PDA 200 directed toward the driver until the display face of the instrument panel 50 and the display panel face of the PDA become substantially parallel to each other, thereby entering a state wherein the individual displays can be observed readily. Further, if a portion of the box 100 in the proximity of the lower edge is pushed with a finger to depress the upper plate 60 from the state of FIGS. 21 and 22, then the box 100 is accommodated into the cover 61 in a state wherein the display panel face of the PDA 200 is directed downwardly as shown in FIG. 23.

Figure 24:
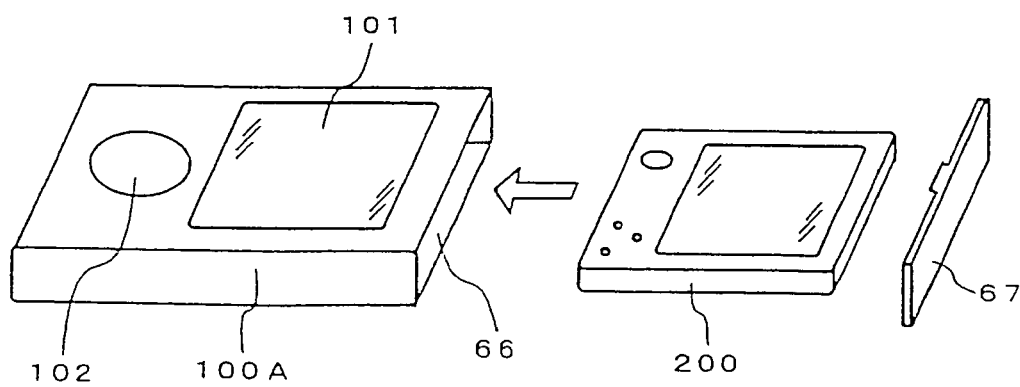
FIG. 24 is an exploded perspective view according to a modification to the box which accommodates a PDA.

While, in the embodiment described above, the lid 103 supported by a hinge is opened and the PDA 200 is inserted or removed, the structure of the box 100 is not limited to this. FIG. 24 is a perspective view of a modification to the box 100. An opening 66 through which a PDA 200 is to be removed or inserted is provided at an end surface of a box 100A, and a lid 67 fits in the opening 66. On the box 100A, a window 101 through which the display panel of a PDA accommodated in the box 100A can be observed and a switch 102 as well as a connector for connection of the terminals of a PDA 200 and so forth (not shown) are provided similarly as in the embodiment of FIG. 13.

Where a PDA 200 is incorporated in and used together with a navigation system, the lid 67 is opened and the PDA 200 is inserted into the box 100A through the opening 66, and then the lid 67 is fitted into the opening 66 to close up the box 100A. On the other hand, when the PDA 200 incorporated in the navigation system is not used, the lid 67 is removed to open the opening 66, and the PDA 200 is removed from the box 100A.

It is to be noted that preferably a packing or a seal to provide for a waterproof or dust proof container is interposed between a fitting face of the box 100 and the lid 103 therefor or between the fitting face of the box 100A and the lid 67 therefor, described hereinabove with reference to FIGS. 13 and 24 and so forth.

According to the present invention, the following effects are achieved.

(1) Since the radio communication apparatus provided on the helmets for individual passengers communicate with each other through a repeating apparatus carried on a vehicle, it is required only to provide each of the radio communication apparatus with a minimum transmission capacity required for communication over a very short distance with the repeating apparatus. Thus, a reduction in the size and the weight of the radio communication apparatus and a reduction of the power consumption are allowed.

(2) Since a transmitter-receiver of each of the radio communication apparatus is mounted at the center of a rear portion of a helmet, the situation where the mounting feeling of the helmet is deteriorated or handling of the helmet becomes difficult does not occur.

(3) Since the repeating apparatus carried on the vehicle side mixes a sound signal outputted from a navigation system, a portable telephone set, a music reproduction apparatus for an MD or a CD or the like with a received sound signal and transmits the mixed signal, the hearing of sound information signaled from the navigation system or the like is not interrupted by a conversation with another passenger.

Further, since sound of the navigation system can be heard not only by a driver and a fellow passenger but also by a passenger of another vehicle simultaneously, upon touring by a plurality of vehicles, the drivers of the vehicles can commonly share information conveniently.

Furthermore, if it is made possible to hear the sound of the navigation system independently of a display of the navigation system, then navigation only with sound is possible.

(4) Since, when a received sound signal and another sound signal outputted from a music reproduction apparatus are mixed and transmitted, a predetermined one of the sound signals can be selectively attenuated or interrupted (muted), a sound signal having a higher degree of importance (or priority) is not disturbed by another sound signal having a lower degree of importance.

(5) Since a circuit board and a power supply (battery) which have comparatively large masses are disposed in the transmitter-receiver to be mounted on each helmet such that they are distributed on the left and the right in a case, even if the transmitter-receiver is mounted at the center of a rear portion of the helmet, the weight balance of the entire helmet is maintained, (6) Since operation buttons of the transmitter-receiver to be mounted on each helmet are provided on a comparatively wide face which is positioned on a rear face where the transmitter-receiver is mounted at the center of a rear portion of the helmet, the operation buttons can be formed with a larger size and can be operated readily and accurately even if a glove is worn on a hand.

(7) Since an antenna of the transmitter-receiver is reduced in size and weight and the size of a circuit board is suppressed to a size equal to that of a cell of the size of a AAA battery, by using a cell of the size of a AAA battery as a power supply, the dead space in the transmitter-receiver is reduced and miniaturization is allowed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radio communication system for a vehicle comprising:
   a radio communication apparatus mounted on helmets to be worn by a driver and a passenger of said vehicle and including at least a speaker, a microphone and a radio wave transmitter-receiver; and
   a repeating apparatus mounted on said vehicle side for communicating with said radio wave transmitter-receiver;
   said radio communication apparatus mounted on one of said helmets communicating with a second of said helmets through said repeating apparatus,
   wherein the repeating apparatus includes a mute function and attenuates or interrupts when a sound source having a higher priority order and another sound source having a lower priority order interfere with each other, a mixing section for combining signals received from two or more radio communication apparatuses, and a mix/mute section for mixing sound signals outputted from the mixing section, a portable telephone set, and a music reproduction apparatus, and providing an output transmission signal.

2. The radio communication system for a vehicle according to claim 1, wherein said repeating apparatus repeats mutual communication between two radio communication apparatus mounted on each of the two helmets and a radio communication apparatus mounted on a third helmet worn by a person other than the passenger or the driver of said vehicle.

3. The radio communication system for a vehicle according to claim 2, wherein said radio wave transmitter-receiver is removably mounted at the center of a rear portion of each of the helmets through a removable fixing member.

4. The radio communication system for a vehicle according to claim 3, wherein said mute function selectively mutes by attenuating or interrupting at least one of the sound signals outputted from a sound signal generation apparatus.

5. The radio communication system for a vehicle according to claim 3, wherein said at least one sound signal generation apparatus is at least one of a navigation system, a portable telephone set, a music reproduction apparatus, some other radio apparatus and a sound board.

6. The radio communication system for a vehicle according to claim 2, wherein said repeating apparatus includes a mixing apparatus to which at least one sound signal generation apparatus which generates a sound signal is connected and which mixes said sound signal or signals outputted from said sound signal generating apparatus with the received sound signal and transmits a resulting signal.

7. The radio communication system for a vehicle according to claim 6, wherein a display apparatus of a navigation system is supported for movement between a use position and an accommodation position.

8. The radio communication system for a vehicle according to claim 1, wherein said repeating apparatus includes a mixing apparatus to which at least one sound signal generation apparatus which generates a sound signal is connected and which mixes said sound signal or signals outputted from said sound signal generating apparatus with the received sound signal and transmits a resulting signal.

9. The radio communication system for a vehicle according to claim 8, wherein said at least one sound signal generation apparatus is at least one of a navigation system, a portable telephone set, a music reproduction apparatus, some other radio apparatus and a sound board.

10. The radio communication system for a vehicle according to claim 1, wherein said radio wave transmitter-receiver has an antenna for radio communication built inside a case of the transceiver-receiver.

11. The radio communication system for a vehicle according to claim 1, wherein said radio wave transmitter-receiver has at least a circuit board and a battery accommodation section, and said circuit board and said battery accommodation section are disposed in such a manner as to be distributed to the left and the right when said radio wave transmitter-receiver is mounted in a predetermined posture at the center of the rear portion of each of the helmets.

12. The radio communication system for a vehicle according to claim 11, wherein said battery accommodation section is sized to correspond to the magnitude of a cell of a size of a AAA battery, the size being equivalent to a size of said circuit board.

13. The radio communication system for a vehicle according to claim 1, further comprising operation buttons including a volume control switch and a power supply switch.

14. The radio communication system for a vehicle according to claim 1, wherein said radio wave transmitter-receiver has a coil antenna accommodated along an upper inner side of a case of the radio transmitter-receiver.

15. A radio communication system for a vehicle comprising:
    a radio communication apparatus mounted on each of helmets to be worn by a driver and a passenger of said vehicle and including at least a speaker, a microphone and a radio wave transmitter-receiver powered by a battery housed within a case of the transmitter-receiver, said radio wave transmitter-receiver including:
       a pair of operation buttons disposed one above another on one side of a rear face of the case, the operations buttons being disposed on either a right side or a left side of the case, and the battery being disposed in the right or the left side of the case opposite to the side where the operations buttons are disposed; and
    a repeating apparatus mounted on said vehicle side for wireless communication with said radio wave transmitter-receiver, said radio communication apparatus being mounted on one of said helmets communicating with a second of said helmets through said repeating apparatus, wherein said repeating apparatus repeats mutual communication between two radio communication apparatus mounted on each of the two helmets worn by the driver and the passenger of said vehicle and a radio communication apparatus mounted on a third helmet worn by a person other than the driver of the passenger of said vehicle, the repeating apparatus including:
       a mixing section for combining signals received from two or more radio communication apparatuses; and
       a mix/mute section for mixing sound signals outputted from the mixing section, a portable telephone set, and a music reproduction apparatus, and providing an output transmission signal.

16. The radio communication system for a vehicle according to claim 15, wherein the mix/mute section includes a mute function and attenuates or interrupts, when a sound source having a higher priority order and another sound source having a lower priority order interferes with each other.

17. The radio communication system for a vehicle according to claim 15, wherein the operation buttons are a volume control switch and a power supply switch.

18. The radio communication system for a vehicle according to claim 15, wherein said radio wave transmitter-receiver has a coil antenna accommodated along an upper inner side of the case of the radio transmitter-receiver.

19. A radio communication system for a vehicle comprising:
- a radio communication apparatus mounted on each of helmets to be worn by a driver and a passenger of said vehicle and including at least a speaker, a microphone and a radio wave transmitter-receiver powered by a battery housed within a case of the radio wave transmitter-receiver; and
- a repeating apparatus mounted on said vehicle side for communicating with said radio wave transmitter-receiver, said radio communication apparatus mounted on one of said helmets communicating with a second of said helmets through said repeating apparatus, wherein said radio wave transmitter-receiver includes
- a mixing section for combining signals received from two or more radio communication apparatuses;
- a mix/mute section for mixing sound signals outputted from the mixing section, a portable telephone set, and a music reproduction apparatus, and providing an output transmission signal;
- a pair of operation buttons disposed one above another on one side of a rear face of the case; and
- a coil antenna accommodated along an upper inner side of the case,
- said radio wave transmitter-receiver being mounted in a predetermined posture at the center of the rear portion of each of said helmets.

* * * * *